(12) United States Patent
Richard

(10) Patent No.: US 10,018,986 B2
(45) Date of Patent: Jul. 10, 2018

(54) MASS FLOW CONTROL FOR A CONVEYOR SYSTEM

(71) Applicant: Clarence Richard, Minnetonka, MN (US)

(72) Inventor: Clarence Richard, Minnetonka, MN (US)

( * ) Notice: Subject to any disclaimer, the term of this patent is extended or adjusted under 35 U.S.C. 154(b) by 352 days.

(21) Appl. No.: 14/732,007

(22) Filed: Jun. 5, 2015

(65) Prior Publication Data

US 2015/0353293 A1 Dec. 10, 2015

Related U.S. Application Data

(60) Provisional application No. 62/008,344, filed on Jun. 5, 2014.

(51) Int. Cl.
*G06F 19/00* (2018.01)
*G05B 19/402* (2006.01)
*B65G 47/19* (2006.01)

(52) U.S. Cl.
CPC .......... *G05B 19/402* (2013.01); *B65G 47/19* (2013.01); *G05B 2219/45054* (2013.01)

(58) Field of Classification Search
None
See application file for complete search history.

(56) References Cited

U.S. PATENT DOCUMENTS

| | | | |
|---|---|---|---|
| 3,412,699 A * | 11/1968 | Culp | F23N 5/24 110/101 R |
| 3,703,952 A | 11/1972 | Kuhn et al. | |
| 4,025,057 A | 5/1977 | Shearer | |
| 4,126,196 A | 11/1978 | Hyer et al. | |
| 4,301,510 A * | 11/1981 | Ricciardi | G01G 11/12 177/25.14 |
| 4,418,773 A | 12/1983 | Finet et al. | |
| 4,706,893 A | 11/1987 | Brock | |
| 4,765,190 A | 8/1988 | Strubbe | |
| 4,793,512 A * | 12/1988 | Krauss | G01G 13/248 222/1 |
| 5,074,435 A * | 12/1991 | Suverkrop | B02C 21/02 177/50 |

(Continued)

FOREIGN PATENT DOCUMENTS

EP     0810276 A1    12/1997

*Primary Examiner* — Miranda Huang
*Assistant Examiner* — Hung Dang
(74) *Attorney, Agent, or Firm* — Westman, Champlin & Koehler, P.A.

(57) ABSTRACT

A material feed system includes a conveyor powered by a motor, a bin disposed to retain and deposit the material on the conveyor, a load transducer configured to sense total weight of the bin and retained material, a tachometer configured to produce a tachometer output reflecting conveyor speed, a motor controller configured supply the motor with a motor control command driving the motor to a volumetrically estimated mass flow rate based on the tachometer, and a compensator configured to compute a gravimetric mass flow rate based on change in total weight sensed by the load transducer. The compensator is disposed to intercept and adjust either the motor control command or the tachometer output, so as to correct for differences between the volumetrically estimated mass flow rate and the gravimetric mass flow rate.

26 Claims, 9 Drawing Sheets

(56) References Cited

U.S. PATENT DOCUMENTS

| | | | |
|---|---|---|---|
| 5,090,813 | A | 2/1992 | McFarland et al. |
| 5,251,976 | A | 10/1993 | Milstead |
| 5,343,761 | A | 9/1994 | Myers |
| 5,556,197 | A | 9/1996 | Loesch |
| 5,784,974 | A * | 7/1998 | Krauss .................... F23N 5/184 110/101 C |
| 5,820,257 | A | 10/1998 | Musil |
| 6,508,049 | B1 | 1/2003 | Cox et al. |
| 6,805,014 | B1 | 10/2004 | Shyy et al. |
| 6,834,442 | B1 | 12/2004 | Bloemendaal |
| 8,708,002 | B2 | 4/2014 | Malenke et al. |
| 2012/0325114 | A1* | 12/2012 | Ackerman .............. C08L 95/00 106/273.1 |

* cited by examiner

MASS FLOW CONTROL FOR A CONVEYOR SYSTEM

CROSS-REFERENCE TO RELATED APPLICATION(S)

This application claims priority of U.S. provisional application No. 62/008,344, filed Jun. 5, 2014, which is hereby incorporated by reference in its entirety.

BACKGROUND

The present invention relates generally to mass flow metering, and more particularly to a conveyor system for using gravimetric metering to control mass flow.

Conveyor belts are used in a variety of applications to transport bulk solid material. Most processing systems using conveyor belts monitor or meter mass flow in some way. Such systems typically estimate mass flow volumetrically, by multiplying a monitored and controlled belt speed by a fixed estimate of linear material density (e.g. kg/m). Such estimates assume that mass flow is dependent only on belt speed, and ignore variations in belt coverage (i.e. variations in width and depth of material on the conveyor belt), material density (e.g. kg/m$^3$), and transport speed (e.g. due to blockage of the belt). For many applications these assumptions are unproblematic. In some other applications, however, the belt coverage, density, and transport speed of material on a conveyor belt can vary considerably during ordinary system operation. In asphalt processing, for example, the density of recycled asphalt shingles to be incorporated into new asphalt production can vary by 15% or more over the contents of a single bin, and bridging can cause partial or even complete obstructions that block material flow despite belt movement. In agricultural applications, similarly, grain and other unprocessed agricultural products can vary in density depending on material size, shape, and packing. There is a need for a mass flow metering system that can compensate for the inaccuracies of purely volumetric metering of such materials, for mechanical problems such as material flow cavitation and bin discharge bridging, and for human error such as bins being allowed to go empty.

SUMMARY

In one aspect, the present invention is directed toward a material feed system that includes a conveyor powered by a motor, a bin disposed to retain and deposit the material on the conveyor, a load transducer configured to sense total weight of the bin and retained material, a tachometer configured to produce a tachometer output reflecting conveyor speed, a motor controller configured supply the motor with a motor control command driving the motor to a volumetrically estimated mass flow rate based on the tachometer, and a compensator configured to compute a gravimetric mass flow rate based on change in total weight sensed by the load transducer. The compensator is disposed to intercept and adjust either the motor control command or the tachometer output, so as to correct for differences between the volumetrically estimated mass flow rate and the gravimetric mass flow rate.

In another aspect, the present invention is directed towards a material processing system including a main conveyor line, a controller disposed on to control the main conveyor line, a feed system, and a control system. The feed system comprises a feed conveyor, a bin, a load transducer, a tachometer, and a compensator. The feed conveyor is powered by a motor and feeding the main conveyor line, and the bin is disposed to retain a material, and deposit that material on the feed conveyor. The tachometer is configured to produce an initial tachometer reading reflecting speed of conveyor, and the compensator is configured to compute a gravimetric mass flow rate based on change in the total weight sensed by the load transducer. The compensator is configured to produce an adjusted tachometer reading by scaling the initial tachometer reading based on both the gravimetric mass flow rate and the volumetrically estimated mass flow rate. The control system is configured to control the main conveyor line, and to command the motor to drive the adjusted tachometer reading towards a first volumetrically determined target speed.

In still another aspect, the present invention is directed towards a method of controlling mass flow along a conveyor system comprising a conveyor driven by a motor, and a bin disposed to deposit material on the conveyor. A weight of the bin is sensed using a load transducer, and a speed of the conveyor via a tachometer. The speed of the conveyor and a known approximate material density on the conveyor are used to produce a volumetric estimate of mass flow rate. The weight of the bin is monitored over a time window to determine a gravimetric mass flow rate. An adjusted tachometer output is produced by scaling the sensed speed by a ratio of the gravimetric mass flow rate to the volumetric estimate of mass flow rate, and the motor is controlled in a gravimetric control mode based on a closed loop that drives the adjusted tachometer output towards a volumetric target speed.

In a further aspect, the present invention is directed towards a gravimetric metering kit for a material feed system comprising a conveyor powered by a motor, a bin disposed to retain and deposit material on the conveyor, a tachometer configured to produce a tachometer output reflecting speed of the conveyor, and a motor controller configured to command the motor to a volumetrically estimated mass flow rate based on the tachometer output. The metering kit includes a load transducer and a compensator. The load transducer is configured to sense a total weight of the bin and retained material. The compensator is configured to compute a gravimetric mass flow rate based on change in the total weight sensed by the load transducer, and adjusts the tachometer output en route to the motor controller to correct for differences between the volumetrically estimated mass flow rate and the gravimetric mass flow rate.

The present summary is provided only by way of example, and not limitation. Other aspects of the present disclosure will be appreciated in view of the entirety of the present disclosure, including the entire text, claims, and accompanying figures.

DETAILED DESCRIPTION

The present invention is directed toward a mass flow metering system that intercepts and adjusts control signals en route to a motor and/or volumetric mass flow controller. The mass flow metering system adjusts those control signals to account for differences between volumetric mass flow estimates and gravimetrically sensed mass flow rates, thereby improving the mass flow metering accuracy possible using existing volumetric hardware.

Figure 1:
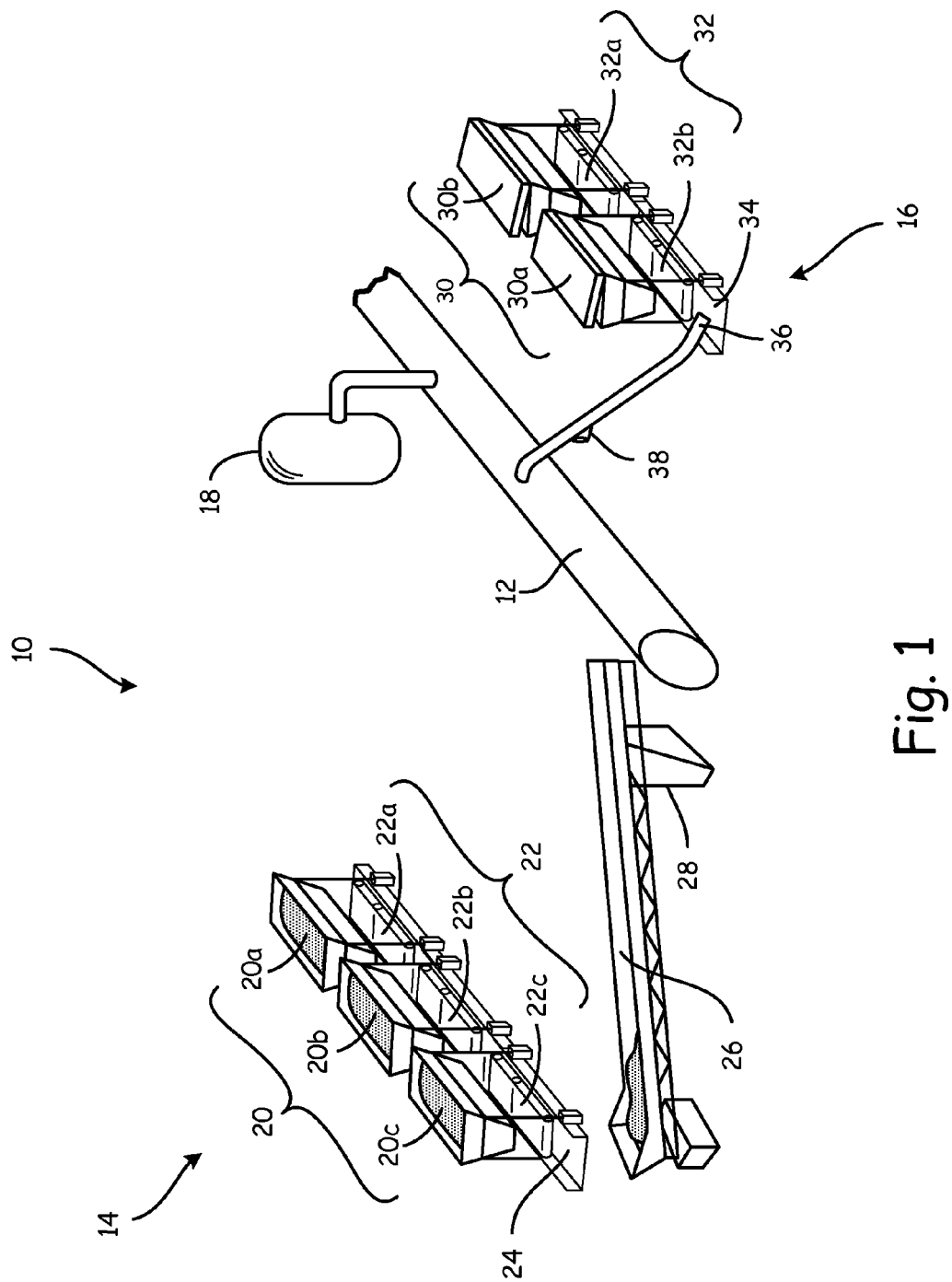
FIG. 1 is a simplified perspective view of a production line.

FIG. 1 is a simplified perspective view of materials processing system 10, which includes mixer 12, virgin aggregate line 14, recycled material line 16, and binder supply 18. In an illustrative embodiment, materials processing system 10 can be an asphalt processing and production plant. Virgin aggregate line 14 includes one or more aggregate bins 20 (i.e. bins 20a, 20b, and 20c) with corresponding aggregate feed conveyors 22 (i.e. conveyors 22a, 22b, and 22c) that feed main aggregate conveyor 24. Main aggregate conveyor 24 carries virgin aggregate to aggregate collecting conveyor 26, with belt scale 28. Recycled material line 16 includes one or more recycled material bins 30 (i.e. bins 30a and 30b) with corresponding recycled material feed conveyors 32 (i.e. conveyors 32a and 32b) that feed main recycled material conveyor 34. Main recycled material conveyor 34 carries recycled material to recycled material collecting conveyor 36, with belt scale 38.

Although materials processing system 10 is described hereinafter as an asphalt processing plant, a person skilled in the art will understand that gravimetric mass flow metering enabled by the present invention can advantageously be applied to other industries, including industrial and agricultural materials processing applications involving flows of solid materials. In the depicted embodiment, aggregate feed conveyors 22, main aggregate conveyor 24, aggregate collecting conveyor 26, recycled material feed conveyors 32, main recycled material conveyor 34, and recycled material collecting conveyor 36 are all motor-driven conveyor belt. The speed of any or all of these conveyor belts can be controlled, but the belt speeds of aggregate feed conveyors 22 and recycled material feed conveyors 32, in particular, control the rate at which material is dispensed from aggregate bins 20 and recycled material bins 30, respectively. These rates determine the proportion of material from each bin (aggregate bins 20a, 20b, and 20c, and recycled material bins 30a and 30b) received at mixer 12 and in turn the makeup of a resultant mixture. In the illustrated embodiment, mixer 12 is a cylindrical mixing line wherein materials are mixed and treated to form asphalt. Mixer 12 can, for example, include rotating drums and ovens or kilns for treating aggregate mixtures. In the illustrated embodiment, mixer 12 mixes and pre-treats virgin aggregate from aggregate bins 20 upstream of recycled material collecting conveyor. Pre-treated virgin aggregate is the further mixed with recycled material and a binder material such as oil from binder supply 18. Mixed and treated material exits mixer 12 at a downstream location for further processing, or for shipping.

In the embodiment depicted in FIG. 1, virgin aggregate line 14 encompasses three aggregate bins 20, which can, for example, contain aggregate of different sizes, e.g. with aggregate bin 20a containing fine aggregate, aggregate bin 20c containing coarse or large aggregate, and aggregate bin 20b containing aggregate of intermediate coarseness. Each aggregate bin 20 can retain a large volume of material, e.g. several tons, and can deposit material on main aggregate conveyor 24 via a corresponding aggregate feed conveyor 22. Aggregate feed conveyors 22 can be controlled to different belt speeds to achieve desired relative mass flow rates and thereby material proportions from each aggregate bin 20, as described in greater detail hereinafter. The combined output of aggregate feed conveyors 22 is carried by main aggregate conveyor 24 and aggregate collecting conveyor 26 to mixer 12. Within mixer 12, material from all aggregate bins 20 is mixed and treated. Belt scale 28 senses the weight of material passing across at least a portion of aggregate collecting conveyor 26, which is used to determine total aggregate mass flow into mixer 12.

In the embodiment depicted in FIG. 1, recycled material line 14 encompasses two recycled material bins 30. Recycled material bins 30 can, for example, contain recycle asphalt shingles (RAS) and/or recycled asphalt product (RAP) from deconstructed pavement. RAS can, for example, be ~20% oil by weight, while RAP can, for example, be ~5% oil by weight. In one embodiment, recycled material bin 30a contains RAP, while recycled material bin 30b contains RAP. Each recycled material bin can retain several tons of material, and deposits material on main recycled material conveyor 34 via a corresponding recycled material feed conveyor 32. Like aggregate feed conveyors 22, recycled material feed conveyors 32 can be controlled to different belt speeds to achieve desired mass flow rates and thereby material proportions from each recycled material bin 30. In some embodiments, for example, typical RAS and RAP can make up 3-5% and 10-35% of total solid material by mass, respectively. Main recycled material conveyor 34 and recycled material collecting conveyor 36 together carry RAS and RAP to mixer 12 at a location downstream of aggregate collecting conveyor 26. Belt scale 38 senses a weight of material passing across at least a portion of recycled material collecting conveyor on the way to mixer 12. This weight is used to determine a total recycled material mass flow rate into mixer 12.

Recycled material is commonly incorporated as a minority (e.g. ~20% by mass) component of new asphalt. Volumetric mass flow metering systems operate by assuming that mass flow rate is proportional to conveyor belt speed, i.e. $R_{vol}=T_{ini}*\rho_{linear}$ where $R_{vol}$ is a volumetric estimate of mass flow rate, $T_{ini}$ is a tachometer output reflecting belt speed, and $\rho_{linear}$ is a linear density (e.g. kg/m) of material. Conventional volumetric systems assume a constant linear material density $\rho_{linear}$ and typically determine this value by bulk weighing. In particular, conventional volumetric systems commonly determine $\rho_{linear}$ by running material through bins at several speeds, and monitoring the mass of material collected over a test period at each speed. Testing volumetric flow rates at different belt speeds helps to linearize for cavitation, but does not account for nonlinear behavior, and does not account for fluctuations in density, distribution, or flow within each bin load. Industry standard volumetric methods do not account for variations in linear density $\rho_{linear}$ over time due to material settling in bins, variations in material shape, size, or orientation of material, or for the condition of material due to handling, storage, and processing.

As compared to virgin aggregate material, recycled materials such as RAS pose several additional or greater difficulties to mass flow metering. Recycled material can be highly irregularly shaped, resulting in unpredictable material density and belt coverage. As a result, the linear density $\rho_{linear}$ of recycled material on recycled material feed conveyors 32 can vary by ±15% or more. In addition, recycled material is more prone to bridging events that can obstruct some or all material flow along recycled material feed conveyor 32. The combination of unpredictable density, unpredictable belt coverage, and flow obstruction caused by bridging makes conventional volumetric mass flow estimates inaccurate, as discussed below with respect to FIGS. 2 and 3. The present invention uses sensed gravimetric mass flow rates to adjust belt control algorithms as described below with respect to FIGS. 2 and 4-8, thereby correcting for these inaccuracies.

Figure 2:
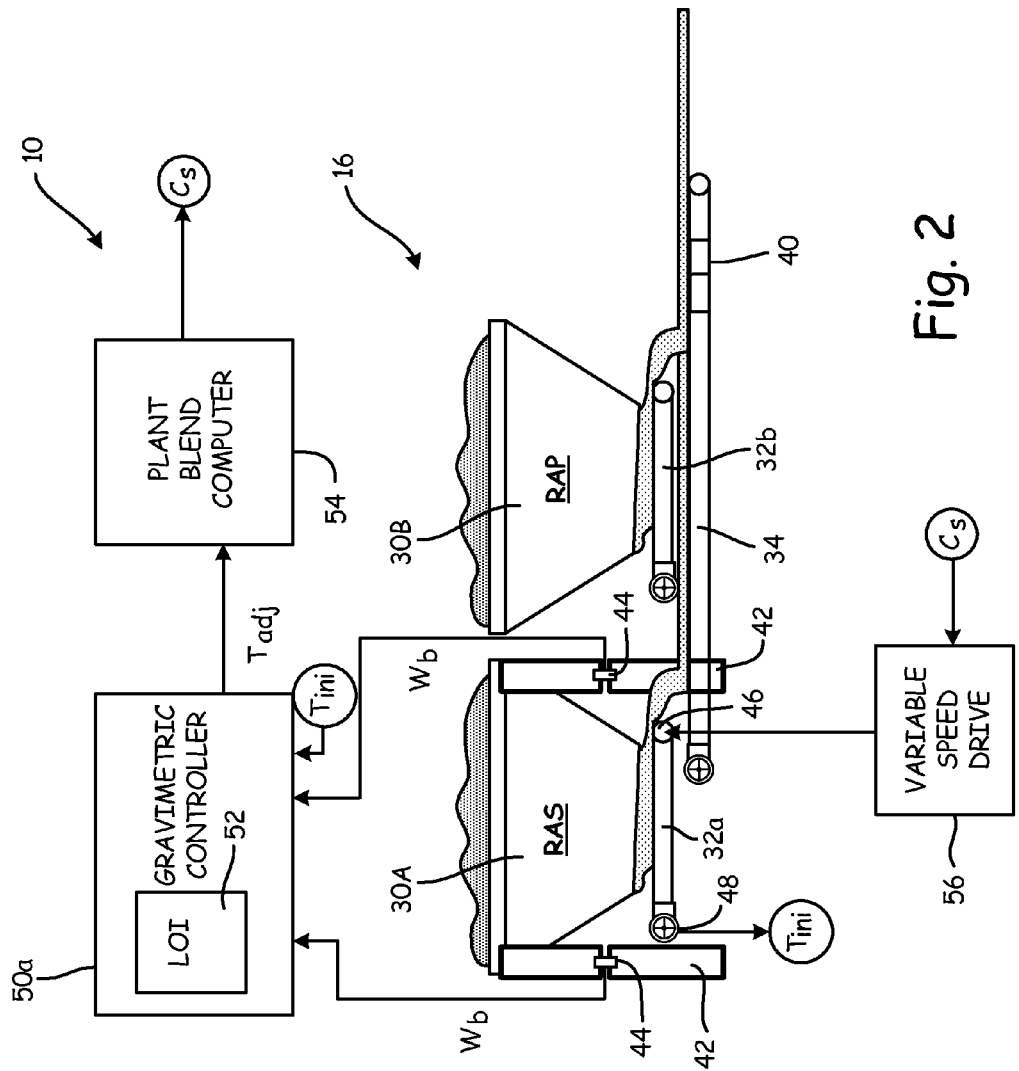
FIG. 2 is a schematic side view of a feed section of the production line of FIG. 1.

FIG. 2 is a schematic side view of a portion of materials processing system 10 including recycled material line 16. FIG. 2 depicts recycled material feed bins 30a and 30b, recycled material feed conveyor 32a and 32b, main recycled material conveyor 34, belt scale 40, supports 42, load cells 44, motor 46, tachometer 48, gravimetric controller 50a (with local operator interface 52), plant blend computer 54, and variable speed drive 56. Although the present description focuses on implementation of the present invention with recycled material line 16, the gravimetric control scheme of the present invention can also be applied to mass flow metering at other locations in system 10, including in virgin aggregate line 14.

As discussed above with respect to FIG. 1, main recycled material conveyor 34 receives recycled material feed bins 30a and 30b at rates determined by the speeds of recycled material feed conveyors 32a and 32b, respectively. In the illustrated embodiment, main recycled material conveyor 34 is outfitted with belt scale 40 to provide a redundant and/or alternative measure of recycled material mass flow to mixer 16 (see FIG. 1). Some embodiments may omit belt scale 40 and/or belt scale 38. Belt scales 40 and/or 38 provide a coarse measure of total mass flow rate along main recycled material conveyor 34. Where recycled material bins 30a and 30b contain different materials (e.g. RAS and RAP), however, the total mass flow rate from recycled material bins 30a and 30b may be insufficient for control purposes. In some applications, for example, materials in recycled material bins 30a and 30b may differ in composition, e.g. with one material having more or less oil, or a different mineral composition. Accordingly, a given mass flow rate sensed at belt scales 38 and/or 40 may be insufficient to determine whether the composition of total material flowing from recycled material bins 30a and 30b is in line with operating requirements of materials processing system 10. To this end, mass flow rates from recycled material bins 30a and 30b are determined separately. Although FIG. 2 only depicts mass flow metering of recycled material bin 30a and recycled material feed conveyor 32a, some embodiments of materials processing system 10 can analogously meter mass flow from recycled material bin 30b and aggregate bins 20a, 20b, and 20c through recycled material feed conveyor 32b and aggregate feed conveyor 22a, 22b, and 22c, respectively. Alternatively, some embodiments of the present invention can use mass flow rates determined from readings of belt scales 38 and/or 40 in combination with mass flow rates from recycled material bin 30a to determine mass flow rates from recycled material bin 30b.

In the illustrated embodiment, plant blend computer 54 acts as a motor controller, and generates speed control signal $C_s$ for variable speed drive 56. Speed control signal $C_s$ can, for example, be a speed reference value either as an absolute speed value, or as a function percentage of maximum output of motor 46. Plant blend computer 54 can, for example, maintain desire mass flow rates via closed or open loop control of variable speed drive 56 and thereby motor 46. Plant blend computer 54 can, for example, vary speed control signal $C_s$ to account for variation in material demand, or to account for events upstream and/or downstream of recycled material feed conveyor 32a and/or recycled material line 16. Variable speed drive 56 drives motor 46 based on speed control signals $C_s$, thereby producing a desired belt speed on recycled material feed conveyor 32a. The actual speed of recycled material feed conveyor 32a is sensed by tachometer 48. Tachometer 48 produces an initial tachometer output $T_{ini}$ that is transmitted to gravimetric controller 50a. Initial tachometer output $T_{ini}$ can, for example, be a frequency-based or digital speed signal. Conventional metering methods for conveyor systems would typically generate volumetric mass flow estimates from initial tachometer output $T_{ini}$ using estimated linear material density on recycled material feed conveyor 32a. The present invention corrects for inaccuracies in such volumetric estimates using sensed gravimetric mass flow determined from change in total change in bin weight accumulated from weight signals $w_b$ over a time window, as described below with respect to FIGS. 4 and 5.

Recycled material bin 30a, like other bins described in the present invention, is positioned atop supports 42. In the illustrated embodiment, supports 42 situate recycled material bin 30a immediately atop recycled material feed conveyor 32b, such that a layer thickness of material dispensed from recycled material bin 30a by gravity is determined at least in part by the vertical distance between recycled material bin 30a and recycled material feed conveyor 32a. A plurality of load cells 44 are disposed about recycled material bin 30a, with one load cell 44 situated on or within each support 42 to substantially evenly support recycled material bin 30a. Load cells 44 are weight transducers, and can, for example, generate a voltage-based bin weight signal $w_b$ with amplitude corresponding to sensed load. In some alternative embodiments, bin weight signal $w_b$ may be an entirely digital signal. Load cells 44 communicate bin weight signals $w_b$ to gravimetric controller 50a either wirelessly or via wired connections, and gravimetric controller 50a aggregates weight signals $w_b$ over time to monitor changes in the total (loaded) weight of recycled material bin 30a, as described below with respect to FIGS. 4-6.

Gravimetric controller 50a determines a gravimetric mass flow rate $R_{grav}$ from accumulated weight signals $w_b$, and produces a volumetrically estimated mass flow rate $R_{vol}$ by scaling initial tachometer output $T_{ini}$ by the estimated linear material density. In the illustrated embodiment, Gravimetric controller 50a is configured to at least sometimes adjust initial tachometer output $T_{ini}$ to account for discrepancies between $R_{vol}$ and $R_{grav}$. In particular, gravimetric controller 50a supplies plant blend controller with adjusted tachometer output $T_{adj}$, where $T_{adj}$ is scaled by the ratio of $R_{grav}$ to $R_{vol}$, as explained in greater detail below with respect to FIGS. 4-6. Gravimetric control 50 also includes local operator interface (LOI) 52, such as a touchscreen, a screen with buttons, or other input/output interface for a local human operator. In one embodiment, LOI 52 incorporates a graphical user interface (GUI) as discussed with respect to FIG. 9.

Figure 3:
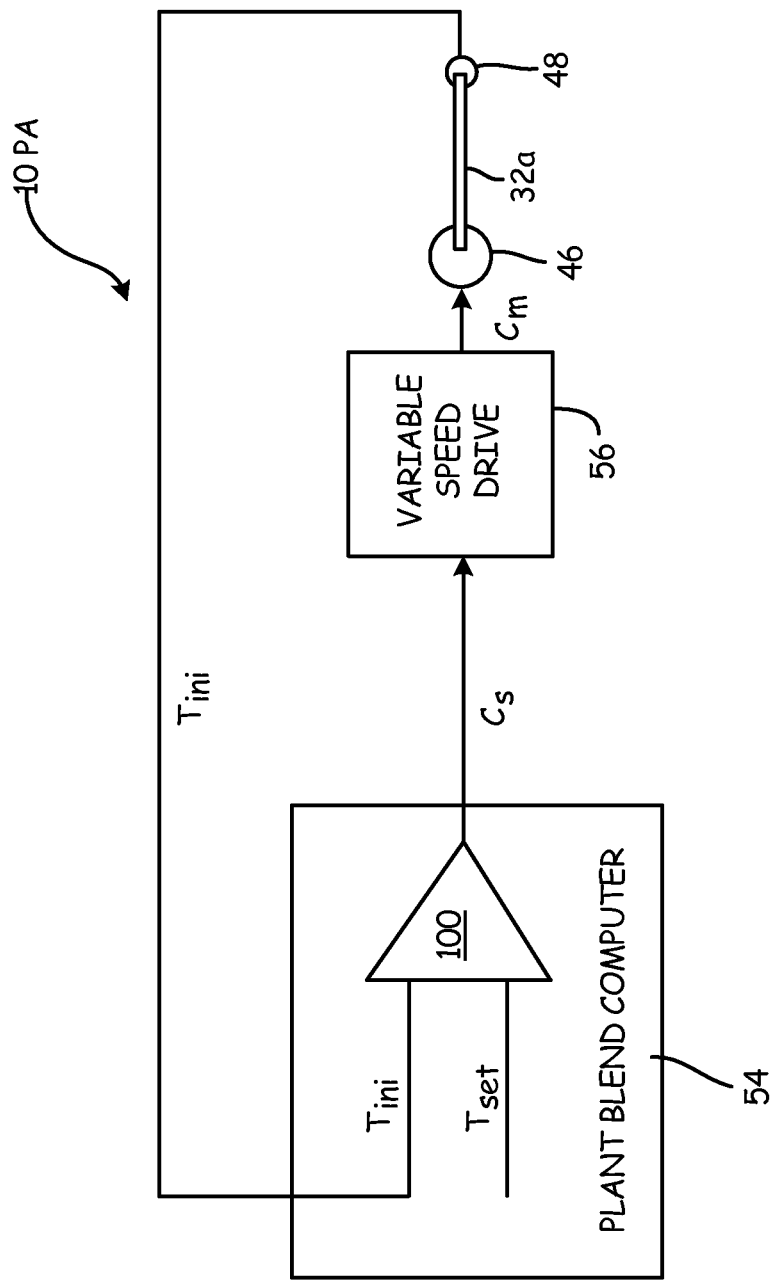
FIG. 3 is a schematic block diagram of a prior art control system for the feed section of FIG. 2.

FIG. 3. is a schematic block diagram of a control system for subset of materials processing system 10PA, a prior art analogue to materials processing system 10. FIG. 3 depicts only one subset of prior art control systems to which the present invention can be applied as an improvement. FIG. 3 illustrates recycled material feed conveyor 32a, motor 46, tachometer 48, plant blend computer 54 (with comparator 100), variable speed drive 56, speed control signal $C_s$, motor control signal $C_m$, initial tachometer output $T_{ini}$, and tachometer setpoint $T_{set}$. FIG. 3 depicts a conventional volumetric control system as discussed above, wherein plant blend computer 54 generates speed control signal $C_s$ via a closed loop control process based on initial tachometer output $T_{ini}$ and tachometer setpoint $T_{set}$. Plant blend computer 54 can, for example, be a dedicated application-specific processor or collection of one or more processors and associated memory. In other embodiments, plant blend computer 54 can be a generic computer running application-specific software. Tachometer setpoint $T_{set}$ is set based on volumetric assumptions, as discussed above, so as to achieve an approximate desired mass flow rate along recycled material feed conveyor 32. Comparator 100 determines a difference between initial tachometer output $T_{ini}$ and tachometer setpoint $T_{set}$, and from this difference produces a speed control signal $C_s$, which variable speed drive 56 uses to correct motor control signal 46 controlling motor 46. Plant blend computer 54 can, for example, vary speed control signal $C_s$ regularly or continuously to ensure that recycled material feed conveyor 32a remains at or near target belt speeds selected based volumetrically on presently desired mass flow rates. Plant blend computer 54 can, for example, include a regularly updating digital comparator 100, or a regularly or continuously updating analog comparator 100.

Figure 4:
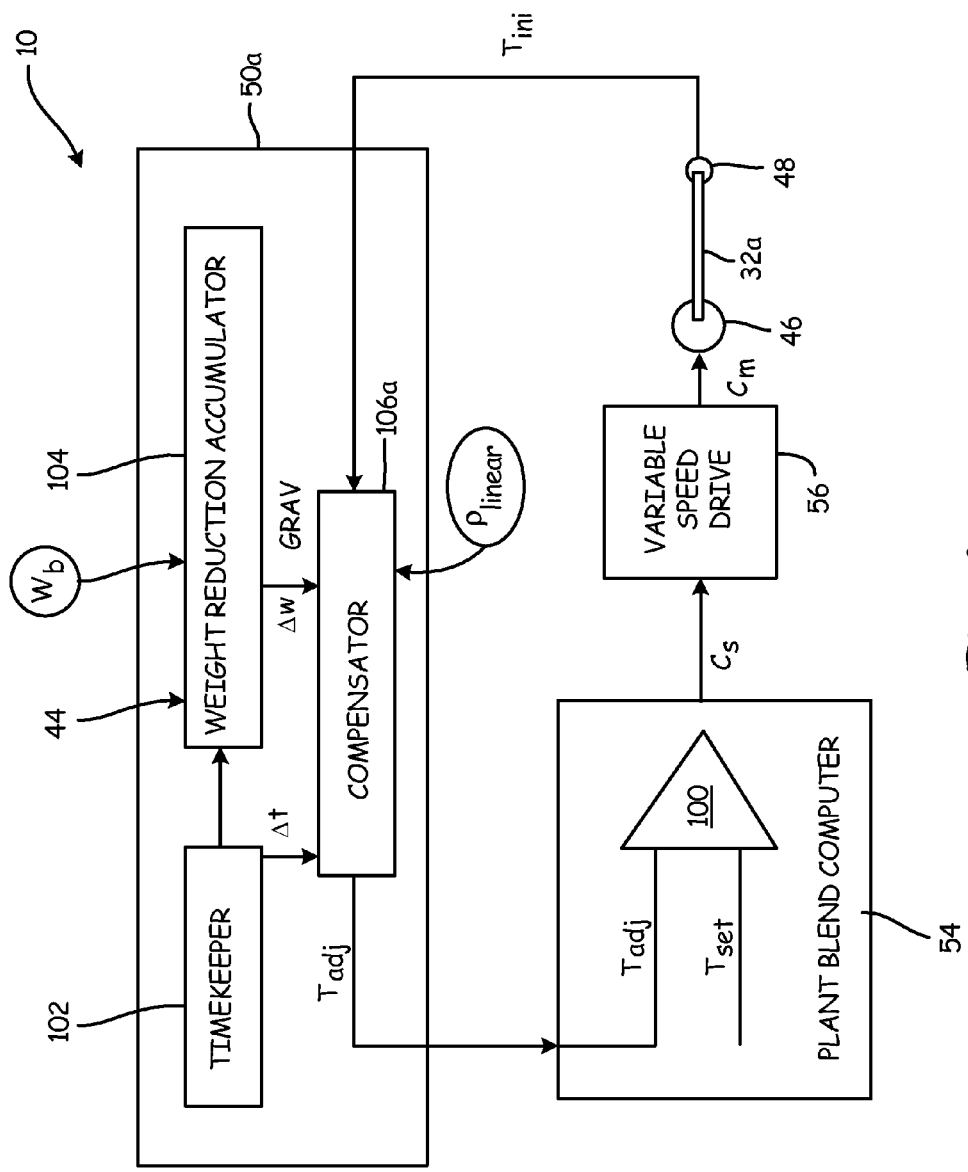
FIG. 4 is a schematic block diagram of one embodiment of a control system for the feed section of FIG. 2, according to the present invention.

FIG. 4 is a schematic block diagram of one embodiment of a control system for materials processing system 10. FIG. 4 illustrates recycled material feed conveyor 32a, motor 46, tachometer 48, gravimetric controller 50a, plant blend computer 54 (with comparator 100), variable speed drive 56, speed control signal $C_{set}$ motor control signal $C_m$, initial tachometer output $T_{ini}$, tachometer setpoint $T_{set}$, adjusted tachometer output $T_{adj}$, weight signal $w_b$, and gravimetric mass flow rate $R_{grav}$. Gravimetric controller 50a includes timekeeper 102, weight reduction accumulator 104, and compensator 106a. Like plant blend computer 54, gravimetric controller 50a can, for example, include one or more processors with associated dedicated memory. The control system of FIG. 4 differs from the prior art control system of materials processing system 10PA in that gravimetric controller 50a intercepts and adjusts initial tachometer output $T_{ini}$, forwarding adjusted tachometer output $T_{ini}$ to comparator 100 of plant blend computer 54 instead of initial tachometer output $T_{ini}$.

Timekeeper 102 governs the timing of weighing windows and control periods, as discussed below. Weight reduction accumulator 104 receives weight signals $w_b$ from load cells 44, and thereby determines a total accumulated weight reduction $\Delta W$ over each weighing window $\Delta t$. Weight reduction accumulator 104 supplies compensator 106a with accumulated weight reduction $\Delta W$, timekeeper 102 supplies compensator 106a with weighing window $\Delta t$, and tachometer 48 supplies compensator 106a with initial tachometer output $T_{ini}$. In some embodiments, timekeeper 102 and weight reduction accumulator 104 may run multiple overlapping weighing windows $\Delta t$, each with an associated total accumulated weight reduction $\Delta W$. Overlapping weighing windows $\Delta t$ can provide compensator 106a with a more up-to-date mass flow information while retaining the stability provided by longer weighing windows. In one embodiment, for example, the use of ten overlapping twenty second weighing windows allows compensator 106a to update a gravimetrically sensed mass flow rate every two seconds.

Compensator 106a also stores linear density $\rho_{linear}$, a volumetrically estimated mass per unit length on recycled material feed conveyor 32a. In some embodiments, linear density $\rho_{linear}$ can be pre-programmed into compensator 106a (e.g. via LOI 52). In other embodiments, linear density $\rho_{linear}$ can be retrieved from plant blend computer 54. From these input values, compensator 106a calculates gravimetric mass flow rate $R_{grav} = \Delta W / \Delta t$, and volumetrically estimated mass flow rate $R_{vol} = T_{ini} * \rho_{linear}$. Overlapping weighing windows $\Delta t$ can allow compensator 106a to provide an up-to-date gravimetric mass flow rate $R_{grav}$ if polled (e.g. by plant blend computer 54) at any time.

Compensator 106a is capable of compensating for discrepancies between $R_{vol}$ and $R_{grav}$ by adjusting initial tachometer output $T_{ini}$ such that adjusted tachometer output $T_{adj} = T_{ini} * R_{grav}/R_{vol}$, i.e. $R_{grav}/R_{vol}$ is used as a scaling factor $F_{scale}$ for $T_{ini}$. Under some circumstances, however, compensator 106a may operate in a volumetric control mode wherein compensator 16 passes initial tachometer output $T_{ini}$ without adjustment (i.e. $T_{adj} = T_{ini}$), as discussed in greater detail below. Otherwise, compensator 106a is capable of operating in a scale control mode and a ratio control mode. In the scale control mode, compensator 106a locks adjusted tachometer value $T_{adj}$ at a fixed value for the duration of the mode (e.g. for 2 seconds). In the ratio control mode, scaling factor $F_{scale}$ is held fixed for the duration of the mode, but adjusted tachometer value $T_{adj}$ is allowed to vary in dependence on initial tachometer value $T_{ini}$, such that $T_{adj} = T_{ini} * R_{grav}/R_{vol}$. Volumetric, scale, and ratio control modes are discussed in further detail below with respect to FIG. 7.

Mass flow rates calculated by compensator 106a can also be used to detect obstruction due to bridging events. In at least some embodiments, compensator 106a detects when scaling factor $F_{scale}$ falls and remains below a threshold value indicative of obstruction. Since volumetrically estimated mass flow rate $R_{vol}$ is based on the assumption on unobstructed mass flow at a pace set by motor 46, a major discrepancy between gravimetric mass flow rate $R_{grav}$ and volumetrically estimated mass flow rate $R_{vol}$ typically indicates that bridged material has caused an obstruction to material flow along recycled material feed conveyor 32a. Gravimetric controller 50a can respond to such bridging events by throwing an alarm, and/or by activating bridge clearing equipment (not shown) such as an automatic blower or scraper to remove the obstruction.

In some embodiments, gravimetric controller 50a can be used to aid volumetric calibration (i.e. determination of $\rho_{linear}$). In particular, gravimetric controller 50a monitors weight depletion of bin 30a, which can be used to more rapidly and accurately generate volumetric estimates of $\rho_{linear}$ than using the conventional technique of weighing accumulated material after running belts at a variety of speeds for extended testing periods. In some instances, gravimetric controller 50a can generate a history of weight depletion that can be correlated with historical belt speeds to obviate the need for at least some separate volumetric calibration periods. In this way, the present invention allows materials processing facilities to avoid lengthy (and therefore costly) calibration down-times.

Figure 5:
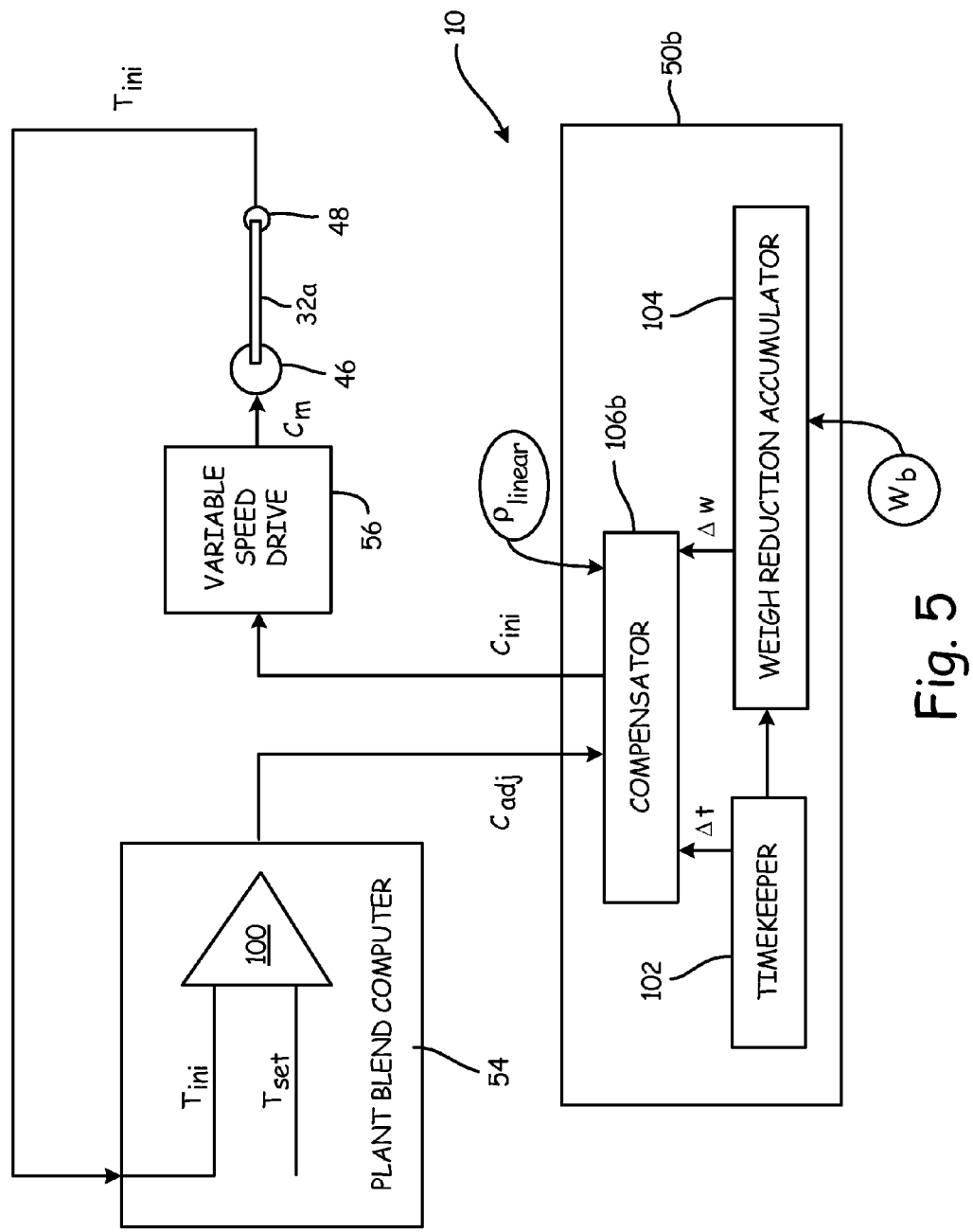
FIG. 5 is a schematic block diagram of another embodiment of a control system for the feed section of FIG. 2, according to the present invention.

FIG. 5 is a schematic block diagram of a second embodiment of a control system for materials processing system 10. FIG. 5 illustrates recycled material feed conveyor 32a, motor 46, tachometer 48, gravimetric controller 50b, plant blend computer 54 (with comparator 100), variable speed drive 56, initial speed control signal $C_{ini}$, adjusted speed control signal $C_{adj}$, motor control signal $C_m$, initial tachometer output $T_{ini}$, tachometer setpoint $T_{set}$, weight signal $w_b$, and gravimetric mass flow rate $R_{grav}$. Gravimetric controller 50b includes timekeeper 102, weight reduction accumulator 104, and compensator 106b. Gravimetric controller 50b operates similarly to gravimetric controller 50a of FIG. 4, but intercepts and adjusts initial speed control signal $C_{ini}$ instead of initial tachometer output $T_{ini}$. Gravimetric controller 50b otherwise operates substantially as described above: compensator 106b calculates gravimetric mass flow rate $R_{grav}$ and volumetrically estimated mass flow rate $R_{vol}$, and scales initial speed control signal $C_{ini}$ such that adjusted speed control signal $C_{adj}=C_{ini}*R_{grav}/R_{vol}$. Because gravimetric controller 50b adjusts the output of plant blend computer 54 rather than its inputs, it can be advantageously applied to any kind of plant blend computer 54. For example, although plant blend computer 54 is illustrated as a closed loop controller that generates control signal $C_{ini}$ using comparator 100, alternative embodiments of plant blend computer 54 can use different inputs, and/or be open loop control systems rather than feedback-based closed loop control systems.

Figure 6:
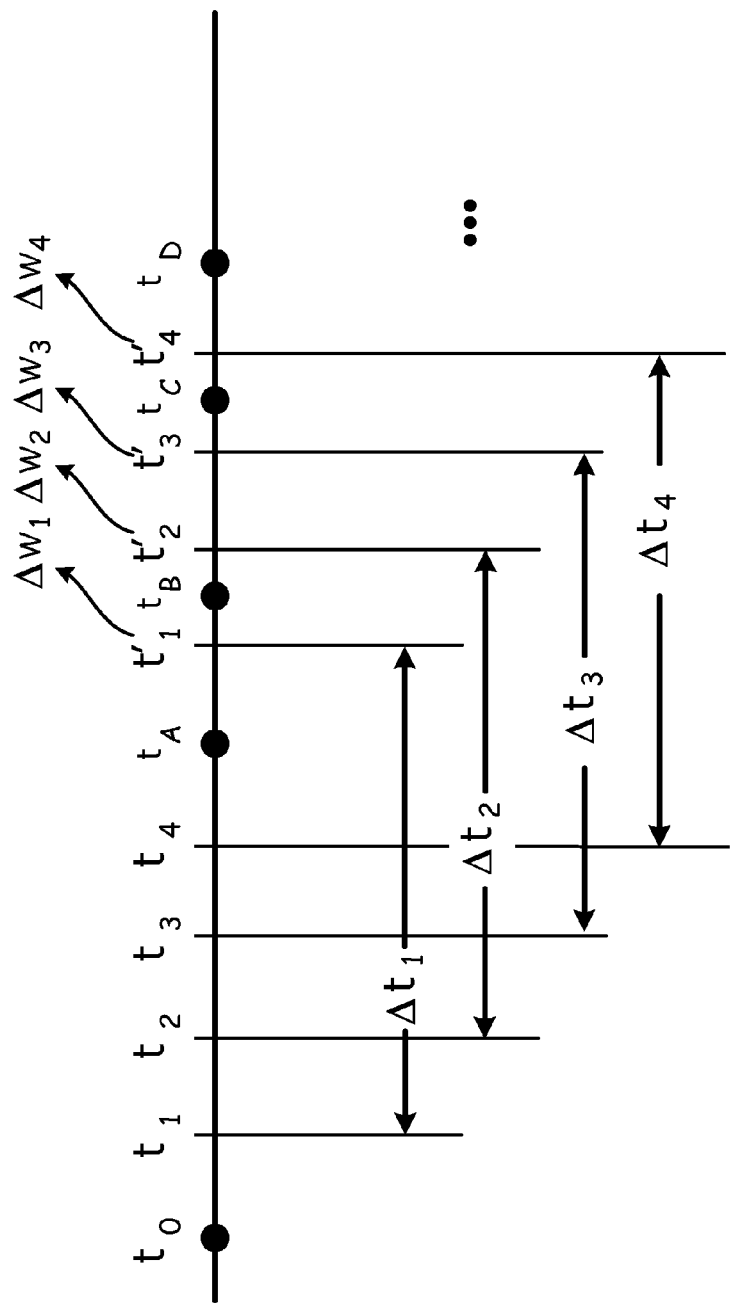
FIG. 6 is a timeline illustrating a weighing process used by the control system of FIGS. 4 and 5, with overlapping weighing windows.

FIG. 6 is a timeline illustrating the operation of overlapping weighing windows $\Delta t$. As discussed above with respect to FIG. 4, in some embodiments of gravimetric controller 50a (and equivalently of gravimetric controller 50b), timekeeper 102 and weight reduction accumulator 104 can run multiple overlapping weighing windows $\Delta t$, each with an associated total accumulated weight reduction $\Delta W$. FIG. 6 illustrates four such weighing windows $\Delta t_1$, $\Delta t_2$, $\Delta t_3$, and $\Delta t_4$. Although only four overlapping weighing windows are shown, in some embodiments of gravimetric controllers 50a and/or 50b each weighing window may overlap with a large number of other weighing windows (e.g. eight or more), especially where each weighing window is long.

Starting sometime after gravimetric controller 50a or 50b activates at $t_0$, the first weighing window $\Delta t_1$ opens at start time $t_1$. Weighing windows $\Delta t_2$, $\Delta t_3$, and $\Delta t_4$, each open at successively later start times $t_2$, $t_3$, and $t_4$. Weighing windows $\Delta t_1$, $\Delta t_2$, $\Delta t_3$, and $\Delta t_4$ each close at end times $t'_1$, $t'_2$, $t'_3$, and $t'_4$, such that each weighing window overlaps with at least its immediate neighbors. In the illustrated embodiment, each weighing window overlaps with all other weighing windows, but this need not be the case in all embodiments. Weighing windows $\Delta t_1$, $\Delta t_2$, $\Delta t_3$, and $\Delta t_4$ are illustrated as having the same duration (i.e. width), but in some embodiments weighing windows of disparate durations can be used.

At the end of each weighing window weight reduction accumulator 105 produces a corresponding accumulated weight reduction $\Delta W$, with weighing windows $\Delta t_1$, $\Delta t_2$, $\Delta t_3$, and $\Delta t_4$ yielding accumulated weight reductions $\Delta W_1$, $\Delta W_2$, $\Delta W_3$, and $\Delta W_4$, respectively. Compensator 106a uses each weighing windows $\Delta t$ and corresponding accumulated weight reduction $\Delta W$ to produce a gravimetric mass flow rate $R_{grav}$ as each weighing window ends. For example, although no weighing information is yet available at time $t_A$, by time $t'_1$ weight reduction accumulator 104 has completed weight reduction window $\Delta t_1$ and compensator 106b generate gravimetric mass flow rate $R_{grav1}=\Delta W_1/\Delta t_1$. If, at a slightly later time $t_B$, compensator 106b requires a gravimetric mass flow rate (e.g. for ratio of scale control; see FIGS. 4, 5, and 7), $R_{grav1}$ will be used for this purpose. Compensator 106a ordinarily uses $\Delta W$ and $\Delta t$ of the most recently completed time window to generate $R_{grav}=\Delta W/\Delta t$; reporting gravimetric mass flow rates $R_{grav3}=\Delta W_3/\Delta t_3$ and $R_{grav4}=\Delta W_4/\Delta t_4$ at times $t_C$ and $t_D$, respectively. In some instances, however, compensator 106a may discard values from anomalous weighing windows, e.g. if an error or alert is thrown, or if weight values fall outside of acceptable bounds. By using multiple overlapping weighing windows, compensator 106a can provide a more up-to-date estimate of gravimetric mass flow rate $R_{grav}$ than would be possible otherwise.

Figure 7:
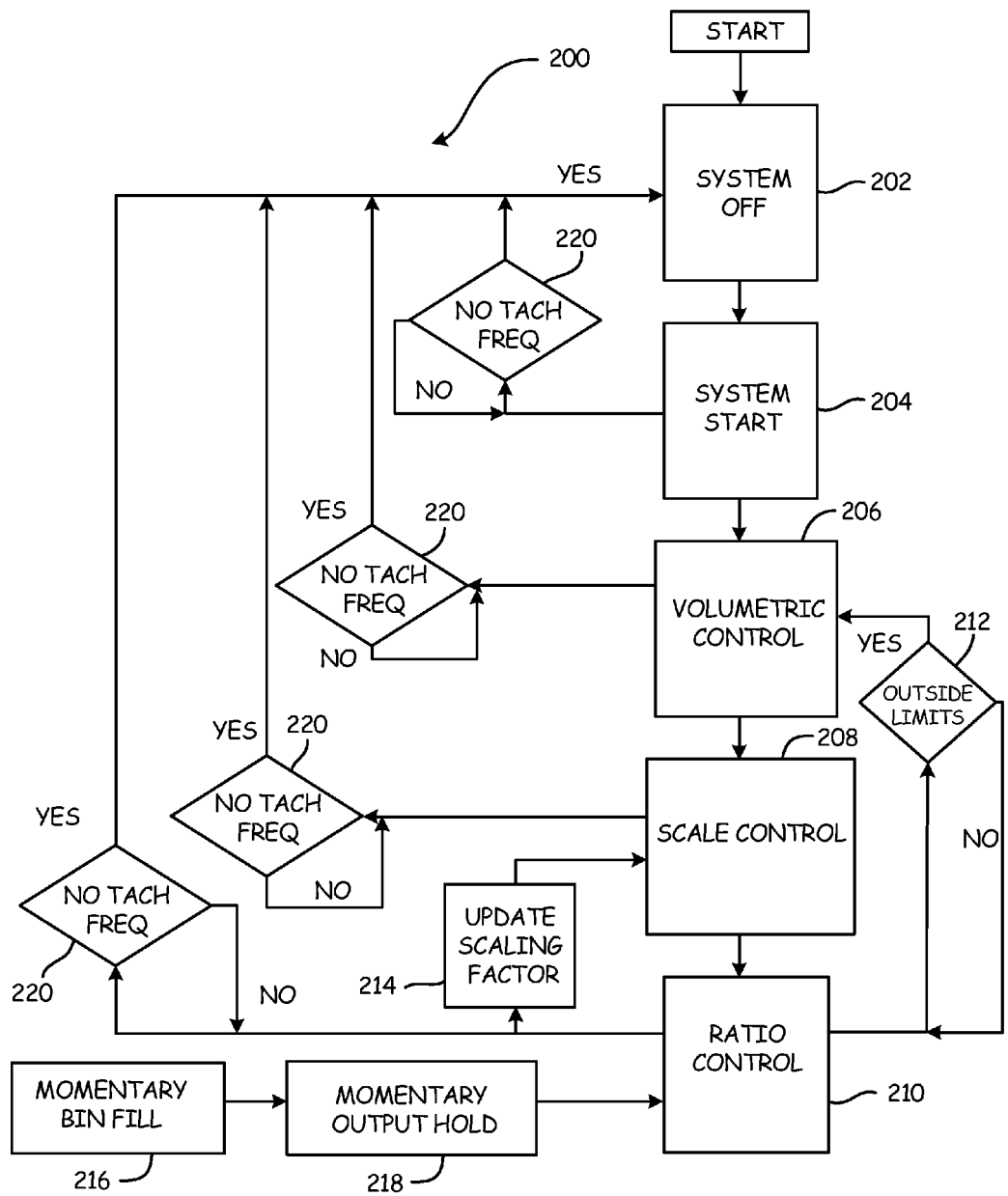
FIG. 7 is a flowchart illustrating a method of operation of the control system of FIG. 4.

FIG. 7 is a flowchart illustrating method 200, a method of operation of gravimetric controller 50a or 50b for materials processing system 10. Discuss hereinafter will focus on operation of gravimetric controller 50a, but method 200 can equivalently be adapted to the operation of gravimetric controller 50b described with respect to FIG. 5 and other controller configurations.

Gravimetric controller 50a begins in an "off" state. (Step 202). Gravimetric controller 50a can start in reaction to a direct operator command, or in response to a start signal from plant blend computer 54 and/or other control hardware of materials processing system 10. (Step 204). Immediately after startup, gravimetric controller 50a operates in volumetric control mode as described above with respect to FIG. 4, wherein compensator 106b forwards initial tachometer value directly to plant blend computer 54, without adjustment (i.e. $T_{adj}=T_{ini}$). (Step S06). The inventor has discovered that a volumetric mode duration of 40-45 seconds works well for recycled asphalt processing applications. More generally, the duration of each mode step in method 200 can be configured to suit the needs of a particular task or system. The duration of the initial volumetric control mode is selected to allow compensator 106b to produce an accurate gravimetric mass flow rate $R_{grav}$. During volumetric mode operation, weight reduction accumulator monitors weight signals $w_b$ to construct an initial value of total accumulated weight reduction $\Delta W$. As noted above with respect to FIGS. 4 and 6, gravimetric controller 50a can run multiple overlapping weighing windows, each tracking an associated total accumulated weight reduction $\Delta W$ (i.e. $\Delta W_1$, $\Delta W_2$, $\Delta W_3$, etc.). In some embodiments these total accumulated weight reductions $\Delta W$ can span the entire duration of initial volumetric control mode. In other embodiments, weight reduction accumulator 104 may not begin registering an accumulated weight reduction $\Delta W$ until sometime after the start of the initial volumetric mode, such that longest weighing window $\Delta t$ is less than the full duration of the initial volumetric mode, so as to help avoid errors due to initial fluctuations in mass flow rate immediately after system startup.

After compensator 106b has operated in the volumetric control mode for at least a weighing window $\Delta t$, gravimetric controller 50a switches to scale control mode. (Step 208). At the start of this scale control mode, compensator 106b uses the most up-to-date calculations of gravimetric mass flow rate $R_{grav}$ (e.g. from the latest completed overlapping weighing window $\Delta t$) and volumetrically estimated mass flow rate $R_{vol}$ (e.g. from the latest initial tachometer output) to set adjusted tachometer output $T_{adj}=T_{ini}*R_{grav}/R_{vol}$. This value of adjusted tachometer ouput $T_{adj}$ remains fixed for the entire duration of scale control mode, which can for example last 2-3 seconds. In general, the duration of the scale control mode is at least sufficient to allow system 10 to respond to errors to the satisfaction of application requirements. By locking adjusted tachometer output $T_{adj}$ for a short period, gravimetric controller 50a avoids hysteresis effects.

After the scale control mode, gravimetric controller 50a switches to a ratio control mode (Step 210) which can, for example, last 40-45 seconds. In general, the ratio control mode can last at least an order of magnitude longer than the scale control mode. Scaling factor $F_{scale}$ remains constant (i.e. at a value determined in scale control mode) when transitioning from scale control mode to ratio control mode, but adjusted tachometer output $T_{adj}$ is allowed to vary based on initial tachometer output $T_{ini}$ such that $T_{adj}=T_{ini}*F_{scale}$. In this way, scaling factor $F_{scale}=R_{grav}/R_{vol}$ compensates for discrepancies between gravimetric mass flow rate $R_{grav}$ and volumetrically estimated mass flow rate $R_{vol}$, while providing plant blend computer with up-to-date values of adjusted tachometer output $T_{adj}$ so that variable speed drive 56 can be controlled in real time according to the schedule or other instructions of plant computer 54. Weight reduction accumulator 104 registers total accumulated weight reduction ΔW during ratio control mode, e.g. wherein each weighing window Δt lasts at most the entire duration of the ratio control mode. Gravimetric controller 50a operates in ratio control mode for at least long enough to produce an accurate new gravimetric mass flow rate $R_{grav}$ with negligible noise.

Gravimetric controller 50a evaluates whether scaling factor $F_{scale}=R_{grav}/R_{vol}$ falls within acceptable limit values selected to indicate failure conditions. If scaling factor $F_{scale}$ falls outside of acceptable limit values, gravimetric controller 50a reverts to the initial volumetric control mode to recalibrate scaling factor $F_{scale}$ as necessary. (Step 212). Trigger setpoints for these limit values can be by a human operator, or by automated processes. In general, trigger setpoints can be established to correspond with critical density swings specific to the particular material flow and system with expected operating parameters.

When the ratio control mode expires, compensator 106a updates scaling factor $F_{scale}$ using the latest estimates of gravimetric mass flow rate $R_{grav}$ and volumetrically estimated mass flow rate $R_{vol}$. (Step 214). Compensator 106a then begins a new operating period in scale control mode (Step 208) using this updated scaling factor $F_{scale}$. If not interrupted by errors or other events, compensator 106a will spend most operational time cycling between scale control mode (Step 208) and ratio control mode (Step 210), updating the scaling factor $F_{scale}$ after each ratio control mode iteration finishes.

Recycled material bins 30 have limited capacity, and must sometimes be refilled. When recycled material bin 30a is filled, load cells 44 register a sudden increase in weight. (Step 216). When this occurs, if compensator 106a is in ratio control mode, adjusted tachometer output $T_{adj}$ is frozen in a momentary output hold until recycled material bin is filled, and has been able to settle. (Step 218). During this momentary output hold, adjusted tachometer value $T_{adj}$ is locked at its previous value. The momentary output hold can, for example, be of similar duration to the initial volumetric control. Once the momentary output hold expires, compensator 106 resumes normal operation in ratio control mode (Step 210). If at any time initial tachometer output $T_{ini}$ becomes unavailable, e.g. due to recycled material line 16 being powered down or due to equipment malfunctions, gravimetric controller 50a switches off. (Step 220).

Method 200 allows gravimetric controller 50a to compensate for discrepancies between gravimetric mass flow rates $R_{grav}$ and volumetrically estimated mass flow rates $R_{vol}$ in substantially real time, while protecting against hysteresis effects and fluctuations from transitory events. In this way, method 200 and gravimetric controller 50a enable plant blend controller 54 to more accurately track and control recycled material feed conveyor 32a than would be possible with a purely volumetric mass flow metering system. Because gravimetric controller 50a interfaces with existing volumetric systems, it can be installed with such systems without need for a large-scale hardware overhaul. Moreover, gravimetric controller 50a cooperates with the existing volumetric mass flow metering of system 10 to enable intelligent detection of bridging events and other obstructions or malfunctions. In particular, the presence of both volumetric and gravimetric mass flow metering approaches within system 10 allows gravimetric controller 50a to compare gravimetric mass flow rate $R_{grav}$ with volumetrically estimated mass flow rate $R_{vol}$. Gravimetric controller 50a can thus detect discrepancies between $R_{grav}$ and $R_{vol}$ that correspond to obstructions and/or malfunctions, and thus identify alarm conditions that would go unnoticed by purely volumetric or purely gravimetric mass flow metering systems.

Figure 8:
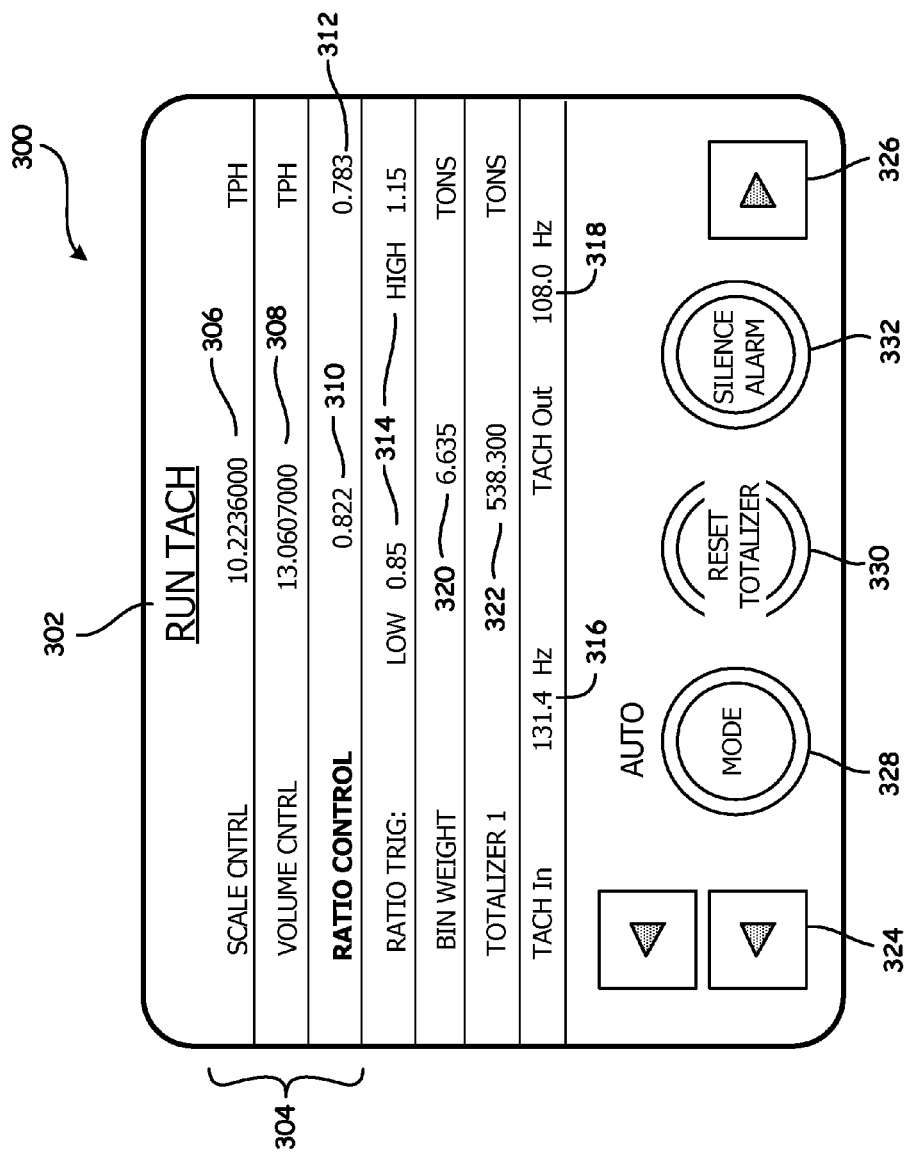
FIG. 8 is an embodiment of a graphical user interface image for the control system of FIG. 4.

FIG. 8 is a layout diagram of one embodiment of GUI 300, a GUI for LOI 52 of gravimetric controller 50. GUI 300 displays multiple fields, including run state indicator 302, control mode indicator 304, gravimetric mass flow rate indicator 306, volumetrically estimated mass flow rate indicator 308, controlling scaling factor indicator 310, latest scaling factor indicator 312, trigger bounds indicator 314, initial tachometer output indicator 316, adjusted tachometer output indicator 318, bin weight indicator 320, weight totalizer indicator 322, menu buttons 324 and 326, automatic ratio toggle button 328, totalizer reset button 330, and alarm silence button 332. FIG. 8 depicts GUI 300 during ratio control mode (see FIG. 7, step 210). GUI 300 can, for example, be a GUI for a touchscreen embodiment of LOI 52 wherein menu buttons 324 and 326, automatic ratio toggle button 328, totalizer reset button 330, and alarm silence button 332 correspond to touchscreen actuation locations. Alternatively, GUI can be a non-touch display wherein menu buttons 324 and 326, automatic ratio toggle button 328, totalizer reset button 330, and alarm silence button 332 align with or otherwise correspond to off-screen input devices.

Run state indicator 302 indicates whether tachometer 48 is currently running. Control mode indicator 304 lists all possible run modes of gravimetric controller 50a, and highlights the current control mode (ratio control, in the illustrated embodiment). Control mode indicator 304 can, for example, highlight the current control mode in a different color or a different font. Gravimetric mass flow rate indicator 306 represents the latest gravimetric mass flow rate $R_{grav}=\Delta W/\Delta t$ calculated from weight accumulated over the latest weighing window. Volumetrically estimated mass flow rate indicator 308 represents the latest volumetrically estimated mass flow rate $R_{vol}=T_{ini}*\rho_{linear}$ calculated from the current initial tachometer output $T_{ini}$. Controlling scaling factor indicator 310 represents the scaling factor $F_{scale}$ currently used to produce adjusted tachometer output $T_{adj}$. Latest scaling factor indicator 312 represents the most recent ratio of $R_{grav}/R_{vol}$ generated using the latest values of gravimetric mass flow rate $R_{grav}$ and volumetrically estimated mass flow rate $R_{vol}$, as shown at gravimetric mass flow rate indicator 306 and volumetrically estimated mass flow rate indicator 308. Latest scaling factor indicator 312 and controlling scaling factor indicator 320 will always match at the start of a new scale control mode. Trigger bounds indicator 314 displays upper and lower bounds of acceptable scaling factors. In the illustrated embodiment, these upper and lower bounds are 0.85 and 1.15, respectively. As discussed above with respect to step 212 of method 200, compensator 106a will revert to a volumetric control mode if the latest scaling factor $F_{scale}$ falls outside of this range. In some embodiments, scaling factor $F_{scale}$ may need to fall outside of the trigger bounds for an extended period (i.e. over several successive updates) to trigger a reversion to volumetric control. Initial tachometer output indicator 316 and adjusted tachometer output indicator 318 display current values of initial tachometer output $T_{ini}$ and adjusted tachometer output $T_{adj}$, respectively.

Bin weight indicator 320 displays the current weight of recycled material bin 30a, as sensed by load cells 44. Weight totalizer indicator 322 tracks total weight depletion over time, as recycled material bin 30a is depleted and refilled. Menu buttons 324 and 326 provide a user interface to access menus to view error and/or event logs, configure controller behavior, and determine setpoints. Menus accessible via 324 can, for example, be used to set linear density $\rho_{linear}$, determine the duration of each operating mode of compensator 106a, and/or set upper and lower bounds of acceptable scaling factors. Automatic ratio toggle button 328 locks scaling factor $F_{scale}$ and disables the mode cycling of method 200, until disengaged. Totalizer reset button 330 zeroes the weight totalizer, and alarm silence button 332 silences any currently sounding alarms, e.g. indicating a bridging event or a tachometer failure.

GUI 300 is only one example of a possible user interface for use with gravimetric controller 50a. In alternative or additional embodiments, controller 50a may, for example, be accessible via a handheld device, a remote controller, or a remote computer running a control client application. In some embodiments, GUI 300 may further include a bypass switch that activates a hardware bypass, allowing initial tachometer output $T_{ini}$ to pass through gravimetric controller 50a without interception.

Figure 9:
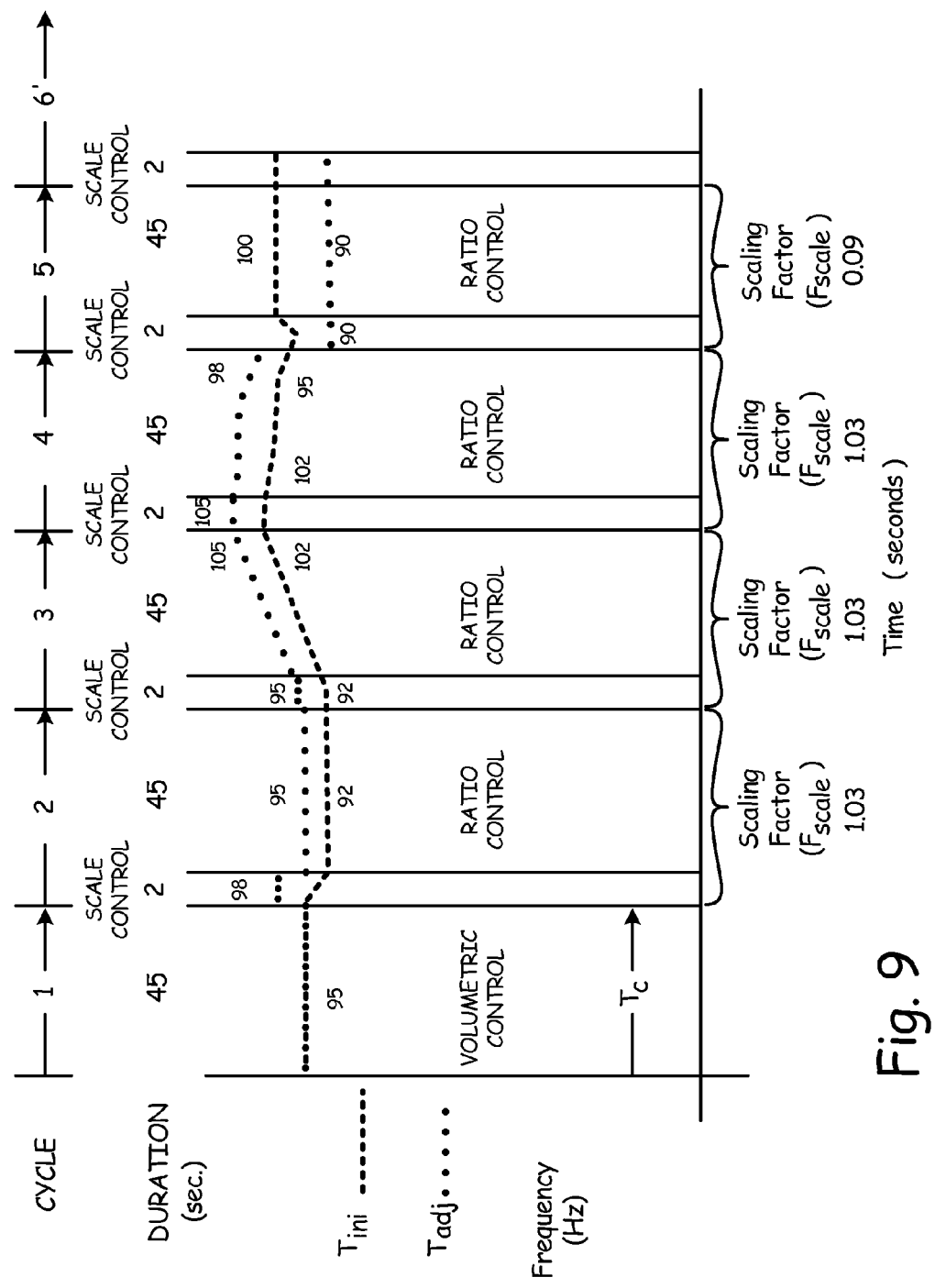
FIG. 9 is a graph of tachometer readings as a function of time in the control system of FIG. 4, illustrating the operation of several distinct control modes While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

FIG. 9 is a graph of initial tachometer output $T_{ini}$ and adjusted tachometer output $T_{adj}$ as a function of time over the course of operation of gravimetric controller 50a. FIG. 9 is not drawn to scale, and the particular numerical values shown are given as illustrative values only.

FIG. 9 illustrates parts of six operating cycles of gravimetric controller 50a. After the first volumetric cycle, each operating cycle begins with a two second period of in scale control mode, followed by a 45 second period in ratio control mode. As described above with respect to FIG. 7 and method 200, gravimetric controller 50a starts operation in a volumetric control mode (see FIG. 7, step 204) wherein initial tachometer output $T_{ini}$ and adjusted tachometer output $T_{adj}$ are equal. During this period of volumetric control gravimetric controller 50a monitors changes in the weight of recycled material bin 30a (i.e. $\Delta W$) over at least one weighing window. During each cycle, gravimetric controller 50a continues to monitor changes in weight. At the start of each scale control period, the latest completed weighing window determines gravimetric mass flow rate $R_{grav} = \Delta W / \Delta t$, which is compared with the volumetrically estimated mass flow rate $R_{vol}$ to produce scaling factor $F_{scale}$. Scaling factor $F_{scale}$ is used to produce adjusted tachometer output $T_{adj}$, such that $T_{adj} = T_{ini} * R_{grav} / R_{vol}$. As described above with respect to FIGS. 4 and 6, adjusted tachometer output $T_{adj}$ is held constant during scale control, but is allowed to vary as a function of initial tachometer output $T_{ini}$ during ratio control. In the illustrated embodiment, scaling factor $F_{scale}$ is 1.03 in cycles 2, 3, and 4, but shifts to 0.9 in cycle 5. During scale control mode, adjusted tachometer output $T_{adj}$ is locked at a constant value regardless of changes in initial tachometer output $T_{ini}$. During ratio control mode, by contrast, changes in initial tachometer output $T_{ini}$ produce proportional changes in adjusted tachometer output $T_{adj}$.

Gravimetric controller 50a and method 200 allow a volumetric conveyor system to be adjusted in real time to account for discrepancies between volumetrically predicted mass flow rates and actual gravimetrically sensed mass flow rates. In this way, the present invention compensates for inaccuracies in volumetric mass flow estimation due to variations in material density or belt coverage, or to material flow obstruction caused by bridging. The present invention also identifies and flags bridging events, enabling obstructing debris to be cleared immediately.

Existing, volumetrically governed conveyor systems can be adapted to use gravimetric data for greatly increased mass flow rate accuracy by incorporating gravimetric controller 50a or 50b. Because gravimetric controllers 50a and 50b intercept and adjust the signals of otherwise volumetrically run systems (either en route to or away from volumetric plant blend computers), these volumetrically run systems can be updated or retro-fitted simply by installing gravimetric controllers 50a, with no need to replace or substantially reconfigured existing volumetric systems. Gravimetric controllers 50a and 50b avoid signal delays from long weighing windows by running a plurality of overlapping weighing windows simultaneously. Consequently, a recent gravimetric mass flow rate $R_{grav}$ is usually available for use in adjusting tachometer and/or motor signals, or to respond to polls from any central controller.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, variations in sensing speed and frequency, signal type variations, signal processing alternatives, and the like While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A material feed system comprising:
   a conveyor powered by a motor;
   a bin disposed to retain material and deposit the material on the conveyor;
   a load transducer configured to sense a total weight of the bin and retained material;

a tachometer configured to regularly or continuously produce a tachometer output reflecting speed of the conveyor, a motor controller configured to supply the motor with a motor control command driving the motor to a volumetrically estimated mass flow rate based on the tachometer output; and a compensator configured to compute a gravimetric mass flow rate based on change in the total weight sensed by the load transducer, and disposed to intercept and adjust a signal from a group consisting of the tachometer output and the motor control command, so as to correct for differences between the volumetrically estimated mass flow rate and the gravimetric mass flow rate, wherein, following an initial volumetric cycle, the compensator is configured to cycle between multiple operating modes on a continuous temporal schedule, the operating modes of the continuous temporal schedule comprising:

a first control mode wherein the adjusted signal is fixed at an adjusted value for an entire duration of the first control mode; and a second control mode wherein the adjusted signal is variably adjusted in real time.

2. The material feed system of claim 1, wherein the adjusted signal is the tachometer output, and wherein the tachometer output is adjusted en route to the motor controller.

3. The material feed system of claim 1, wherein the adjusted signal is the motor control command, and the motor control command is intercepted en route to the motor.

4. The material feed system of claim 1, wherein the intercepted signal is adjusted by scaling the intercepted signal by a ratio of the gravimetric mass flow rate to the volumetrically estimated mass flow rate.

5. The material feed system of claim 4, wherein the first control mode is scale control mode wherein the intercepted signal is fixed at a scaled value, and wherein the second control mode is a ratio control mode wherein the intercepted signal is scaled in real time.

6. The material feed system of claim 5, wherein the compensator spends longer in the ratio control mode than the scale control mode.

7. The material feed system of claim 1, wherein a mass density of the material varies by at least ±15% during ordinary operation of the material feed system.

8. The material feed system of claim 1, wherein the load transducer comprises a plurality of load cells disposed in a support structure that supports the bin.

9. A material processing system, the material processing system comprising:

a main conveyor line;

a controller disposed to control the main conveyor line; and a first feed system comprising:

a feed conveyor powered by a motor and feeding the main conveyor line;

a bin disposed to retain a first material and deposit the first material on the feed conveyor;

a load transducer configured to sense a total weight of the bin and retained first material;

a tachometer configured to produce an initial tachometer reading reflecting speed of the feed conveyor on at least a regular basis;

a compensator configured to dynamically compute a gravimetric mass flow rate based on change in the total weight sensed by the load transducer over multiple time periods, at least some of the multiple time periods overlapping each other, and to produce an adjusted tachometer reading by scaling the initial tachometer reading based on the gravimetric mass flow rate for a first of the multiple time periods and a volumetrically estimated mass flow rate for the first time period; and a control system configured to control the feed conveyor, and further configured to command the motor to drive the adjusted tachometer reading toward a first volumetrically determined target speed.

10. The material processing system of claim 9, wherein the compensator is configured to produce the adjusted tachometer reading by multiplying the initial tachometer reading by a ratio of the gravimetric mass flow rate to the volumetrically estimated mass flow rate.

11. The material processing system of claim 9, wherein the volumetrically estimated mass flow rate is the initial tachometer reading times an expected density of the first material per unit distance, and the first volumetrically determined target speed is a target mass flow rate divided by the expected density of the first material per unit distance.

12. The material processing system of claim 9, further comprising a second feed system carrying a second material with a second volumetrically determined target speed, the first material being different than the second material, and wherein the first and second volumetrically determined target speeds are controlled to provide a target proportion and total mass flow rate of a mixture of the first and second materials on the main conveyor line.

13. The material processing system of claim 12, wherein the first material is asphalt shingle material, wherein the second material is asphalt pavement material, and wherein the first and second volumetrically determined target speeds are selected to control a total proportion of oil on the main conveyor line including oil from the first and second materials.

14. The material processing system of claim 9, wherein the first feed system comprises an obstruction detection system configured to sense bridged material on the feed conveyor in response to the gravimetric mass flow rate falling below a threshold fraction of volumetrically estimated mass flow rate.

15. A method of controlling mass flow along a conveyor system comprising a conveyor driven by a motor, and a bin disposed to deposit material on the conveyor, the method comprising:

sensing a weight of the bin via a load transducer over each of multiple time windows, at least some of which overlap;

sensing a speed of the conveyor via a tachometer;

producing a volumetric estimate of mass flow rate based on the speed of the conveyor and known approximate material density on the conveyor;

monitoring a change in the weight of the bin over a first time window to determine a gravimetric mass flow rate, wherein the first time window is one of the multiple time windows;

producing an adjusted tachometer output by scaling the sensed speed by a ratio of the gravimetric mass flow rate to the volumetric estimate of mass flow rate; and controlling the motor in a gravimetric control mode based on a closed loop that drives the adjusted tachometer output towards a volumetric target speed.

16. The method of claim 15, wherein producing an adjusted tachometer output comprises:

switching to a scale control mode wherein the adjusted tachometer output is fixed at an instantaneous initial value of the sensed conveyor speed multiplied by a previously sensed ratio of the gravimetric mass flow rate to the volumetric estimate of mass flow rate; and switching to a ratio control mode wherein the adjusted tachometer output is produced by scaling the sensed conveyor speed in real time by the previously sensed ratio of the gravimetric mass flow rate to the volumetric estimate of mass flow rate.

17. The method of claim 16, wherein the ratio control mode lasts more than a factor of ten times longer than the scale control mode.

18. The method of claim 16, further comprising:
controlling the motor in a volumetric control mode based on a closed loop that drives the sensed conveyor speed towards a volumetric target speed.

19. The method of claim 18, wherein the volumetric control mode governs the motor during an initial startup and reset period, and the gravimetric control mode governs the motor otherwise.

20. The method of claim 19, further comprising:
commencing a reset period whenever the ratio of the gravimetric mass flow rate to the volumetric estimate of mass flow rate falls outside of an accepted range.

21. The method of claim 15, further comprising:
identifying a bridging event when the gravimetric flow rate falls and remains for at least a threshold time below an alarm level.

22. The method of claim 21, wherein the alarm level is an alarm ratio of the gravimetric flow rate and the volumetric estimate of mass flow rate.

23. A gravimetric metering kit for a material feed system comprising a conveyor powered by a motor, a bin disposed to retain and deposit material on the conveyor, a tachometer configured to produce a tachometer output reflecting speed of the conveyor, and a motor controller configured to command the motor to a volumetrically estimated mass flow rate based on the tachometer output, the gravimetric metering kit comprising:
a load transducer configured to sense a total weight of the bin and retained material; and
a compensator configured to compute a gravimetric mass flow rate based on change in the total weight sensed by the load transducer, and further configured to adjust the tachometer output en route to the motor controller to correct for differences between the volumetrically estimated mass flow rate and the gravimetric mass flow rate, wherein, following an initial volumetric cycle, the compensator is configured to cycle between multiple operating modes on a continuous temporal schedule, the operating modes of the continuous temporal schedule comprising:
a first control mode wherein the adjusted tachometer output is fixed at an adjusted value for an entire duration of the first control mode, regardless of changes in the unadjusted tachometer output during the first control mode; and
a second control mode wherein the adjusted tachometer output is variably adjusted in real time.

24. The gravimetric metering kit of claim 23, wherein the compensator is configured to adjust the tachometer output by scaling the tachometer output by a ratio of the gravimetric mass flow rate to the volumetrically estimated mass flow rate.

25. The gravimetric metering kit of claim 24, wherein the first control mode is a scale control mode wherein the adjusted tachometer output is fixed at a scaled value, and wherein the second control mode is a ratio control mode wherein the tachometer output is variably scaled in real time.

26. The gravimetric metering kit of claim 23, wherein the load transducer comprises a plurality of load cells disposed in a support structure that supports the bin.

* * * * *